United States Patent [19]

Mathivat et al.

[11] Patent Number: 5,007,949
[45] Date of Patent: Apr. 16, 1991

[54] SUPPORT FRAME FOR A GLASS SHEET

[75] Inventors: Denis Mathivat; Jean-Marc Petitcollin, both of Thourotte, France

[73] Assignee: Saint-Gobain Vitrage International, Courbevoie, France

[21] Appl. No.: 453,938

[22] Filed: Dec. 20, 1989

[30] Foreign Application Priority Data

Dec. 21, 1988 [FR] France .................... 88 16892

[51] Int. Cl.⁵ .................................... C03B 23/03
[52] U.S. Cl. ........................... 65/160; 65/104; 65/106; 65/289
[58] Field of Search ............... 65/104, 106, 118, 287, 65/289, 160, 29

[56] References Cited

U.S. PATENT DOCUMENTS

| | | | |
|---|---|---|---|
| 4,364,766 | 12/1982 | Nitschke | 65/163 |
| 4,666,491 | 5/1987 | Ehre | 65/27 |
| 4,666,492 | 5/1987 | Thimons et al. | 65/104 X |
| 4,767,434 | 8/1988 | Schwartz et al. | 65/104 X |

Primary Examiner—Robert L. Lindsay
Attorney, Agent, or Firm—Oblon, Spivak, McClelland, Maier & Neustadt

[57] ABSTRACT

The invention relates to a support frame for a glass sheet heated to beyond its deformation temperature and having a shape adapted to the contour of the glass sheet and mounted on a moving trolley, which has a contactless glass sheet detection device, the detected quality being converted into electrical pulses.

8 Claims, 2 Drawing Sheets

SUPPORT FRAME FOR A GLASS SHEET

BACKGROUND OF THE INVENTION

1. Field of the Invention

The present invention relates to a support frame for a glass sheet heated beyond its deformation temperature or point and in particular a frame for recovering a glass sheet after its convex bending or cambering; and for transferring the glass sheet from the molding cell to the tempering cell, where it undergoes intense cooling on its two faces in order to improve certain of its mechanical characteristics. The invention particularly applies to the production of safety glass windows for cars, such as side windows, opening roofs or rear windows.

In cambering-tempering processes carried out in the horizontal position such as those described in French Patents 2,085,464, 2,596,751 and 2,567,508 or European patent 3,391, the glass sheet is passed through a reheating furnace up to a molding unit, where it is vertically displaced in order to abut against an upper cambering mold, whose contours it essentially adopts. The at least partly shaped glass sheet is then released onto a support frame, which is then called the tempering frame and which transfers the glass sheet to the tempering means.

1. Discussion of the Background Art

In the aforementioned patent publications, the glass sheet is maintained against the upper cambering mold by pneumatic forces generated by an upward hot air stream (FR-A-2 567 508) or by suction on the periphery of the glass plate or window (FR-A-2 085 464 o FR-A-2 596 751), or by suction over the entire glass surface (EP-A-3 391). In order to pass the glass sheet from the upper cambering mold to the tempering mold, the pneumatic force generators are cut off, so that the glass sheet is then only subject to its own weight and gravity makes it fall onto the support frame. However, the instant of the fall, or more specifically, the instant at which the glass sheet loses all contact with the upper cambering mold, does not precisely coincide with that of the stoppage of the pneumatic forces. Thus, the application of the glass sheet to the upper cambering mold generates frictional forces, which tend to hold the glass sheet. However, these frictional forces have amplitudes which vary as a function of the curvature of the upper cambering molds (the frictional forces increasing as the cambering mold approaches a basket handle shape) and also the wear to the interposed paper or fabric sheet conventionally used for covering the upper cambering mold and which constitutes the contact surface with a glass.

The consequence of this phenomenon is not only that the glass sheet drops systematically with a certain delay, but also with a delay which differs between the individual glass plates. Therefore, the time spent by the glass sheet on the support frame varies. If the fall of the glass sheet takes place rapidly, the residence time is longer and the glass will deform on the support frame, which creates an undesired double cambering. However, if the drop is slower or delayed, the fall can take place at an inopportune time, for example, when the frame is already moving towards the tempering cell. The sheet is then badly positioned on the tempering frame, which leads to optical defects and/or to incomplete tempering. In the worst possible case, the glass sheet may not even be recovered by the frame, which causes the problem of the removal of cullet below the molding cell, particularly when using a rising hot air stream for raising the glass plate.

In order to remedy these disadvantages, it is known inter alia from European Patent 3,392 to bring about the dropping of the glass sheet not only by eliminating the forces maintaining it against the upper cambering mold, but also by forcing the same through the application of a gaseous pressure. This is a suitable process for upper cambering molds equipped with a plurality of suction orifices. It can easily be realized in this case by providing suction pumps, which are reversible and by using the suction orifices as blowing orifices. However, for other upper mold types, i.e., for upper molds not equipped with suction orifices, it is much more difficult to put into effect, because it is necessary to provide a complimentary blowing circuit.

SUMMARY OF THE INVENTION

Accordingly, an object of this invention is to provide for a novel apparatus which makes it possible to more simply remedy the aforementioned disadvantages.

The present invention relates to a support frame for a glass sheet that is heated to a temperature beyond its deformation temperature comprising: a moving trolley, the support frame being mounted on the moving trolley and having a shape adapted to the contour of the glass sheet; a contactless detection device for detecting the presence of the glass sheet and generating a signal indicative thereof; and means for converting the signal into electrical pulses.

The device for converting into electrical pulses the detected signal is preferably fixed to the moving trolley carrying the support frame. Only the voltmeter and the automatic means recording the signals are placed outside the glass treatment enclosure. They are connected to the conversion device by a flexible electric cable having an adequate length to allow all the movements of the trolley.

The detected signal is, e.g., the counterpressure induced by the reflection on the surface of the glass sheet of a pressurized gas jet or a reflected light beam.

According to a first embodiment of the invention, the contactless detection device is a pneumatic detection device, which senses the pressure variation of a pressurized gas jet, such as air, when the jet is interrupted by the presence of the glass sheet.

Preferably, the supply pressure of the compressed air jet is chosen in such a way that the sensed pressure variation is between 10 and 300 Pascals. Very satisfactory results are obtained if the pressure variation is approximately 200 Pascals. The working pressures are then very low, which advantageously eliminates any risk of the glass being marked by the impact of the jet.

Moreover, the pressurized jet is preferably supplied at a temperature substantially equal to the temperature of the glass, i.e., to the temperature of the molding cell. Thus, detection has no influence on the glass plate.

Detection is obtained by a measurement of the pressure difference reflection. The emission of the pressurized gas jet takes place on the edges of the tempering frame towards the surface carrying the glass, the jet being directed in a direction substantially perpendicular to the surface of the glass.

The detection measurement is carried out by a sensor, namely a differential pressure transmitter, whose supply tube is mounted coaxially to the pressurized gas emission tube.

A detector according to this first embodiment comprises, e.g., an emitter having a pressurized gas source, optionally an air filtering unit, a pressure regulating unit, an air heating member and an emission member. Preferably the emission member is constituted by a ring-shaped nozzle mounted at the end of a tube and in the center of which is located the receiving tube connected to the differential pressure transmitter, which converts the pressure measurement into an electrical signal supplied to an automatic means for processing. In this case, the best results are obtained for a distance between the nozzle head and the glass of approximately 2 mm. The nozzle head is advantageously placed in a recess provided in the support frame.

According to a second embodiment of the invention, the contactless detection device is a device for detecting the reflection of a light beam by the glass sheet. The light beam is passed from its source to the vicinity of the glass sheet and then, following reflection on the latter is passed to the photoelectric sensor by a waveguide of the optical fiber type having a radial outlet. Preferably, the optical fiber is provided with a cooling circuit.

Preferably, the free path of the light beam, i.e., outside the optical fiber is at the most 60 mm (outward and return). The fiber is advantageously fixed beneath the support frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
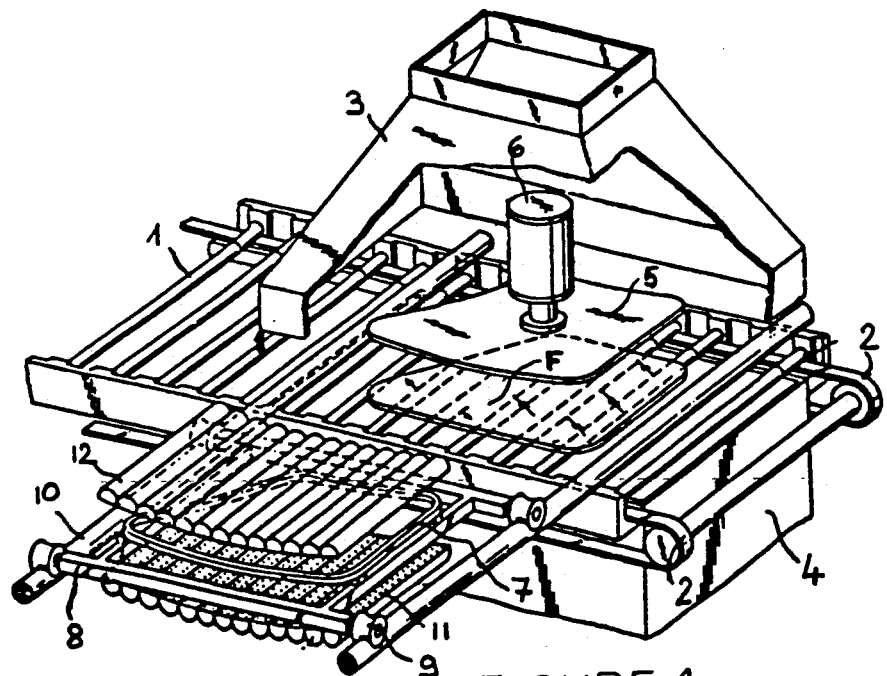
FIG. 1 shows a diagram in perspective of a cambering-tempering installation.

FIG. 1 shows a few components of a cambering-tempering line in the horizontal position for the purpose of obtaining car safety glass windows.

From a tunnel furnace or oven not shown, the glass sheets F are individually passed along a conveyor 1 having a roller bed driven by belts 2. The glass sheets are immobilized beneath an upper cambering mold 5, whose side facing the conveyor is covered with a fabric or paper sheet. The upper cambering mold 5 moves along its vertical axis by means of winching members which are not shown. It is placed in a thermally insulated bottom-less box-like structure 3. In the case shown here, the glass sheet is raised so as to abut against the lower side of the upper cambering mold by means of a hot air stream coming from the lower box-like structure 4. In other cases, the glass sheet F is raised by suction. As soon as the glass sheet F is in contact with the upper cambering mold 5, the upper cambering mold 5 is raised by means of an appropriate device 6, which makes it possible to place between the conveyor and the glass sheet F, a support frame 7 which acts as a recovery and tempering frame mounted on a trolley or carriage 8 equipped with wheels 9 running on rails 10, which are in this case perpendicular to the conveyor axis and in other installations are parallel thereto. These rails bring the trolley up to a tempering cell having lower 11 and upper 12 box-like structures for blowing cold air onto the two faces of the glass sheet F, in order to intensely cool them and improve their mechanical strength properties. In the case shown here, the transfer of glass sheet F from its upper position in contact with the lower side of the upper mold, to its lower position placed on the support frame takes place under the action of gravity, the pressure of the upward hot air stream being brought to zero or at least to a value inadequate for compensating the weight of the glass plate.

However, even if the variation in the pressure generating the forces for applying the glass sheet against the upper cambering mold can be considered as instantaneous and in all cases as perfectly reproducible, this does not apply with respect to the fall of the glass sheet. Thus, its contact with the interposed fabric or paper sheet takes place with a certain friction, which creates frictional forces, whose amplitudes vary as a function of the surface state of the interposed sheet and also as a function of the curvature of the upper cambering mold. These frictional forces lead to a certain delay in the fall of the glass sheet. Consequently, if the instant where the support frame starts to oscillate is defined solely with reference to the instant of the pressure variation of the pneumatic forces applying the glass to the upper mold, there is a variation in the transfer time, i.e., the time elapsing between the taking up of the glass sheet by the support frame and the start of the tempering blowing. This transfer time variation is a few tenths of a second, however, at this stage of the glass plate production process, the glass temperature is between 650° and 700° C. Thus, the glass still has a considerable plasticity and these few tenths of a second more or less are sufficient to bring about a deformation of the glass plate and in particular to the formation of a double cambering, which is detrimental to the optical quality of the glass plate or window.

Figure 2:
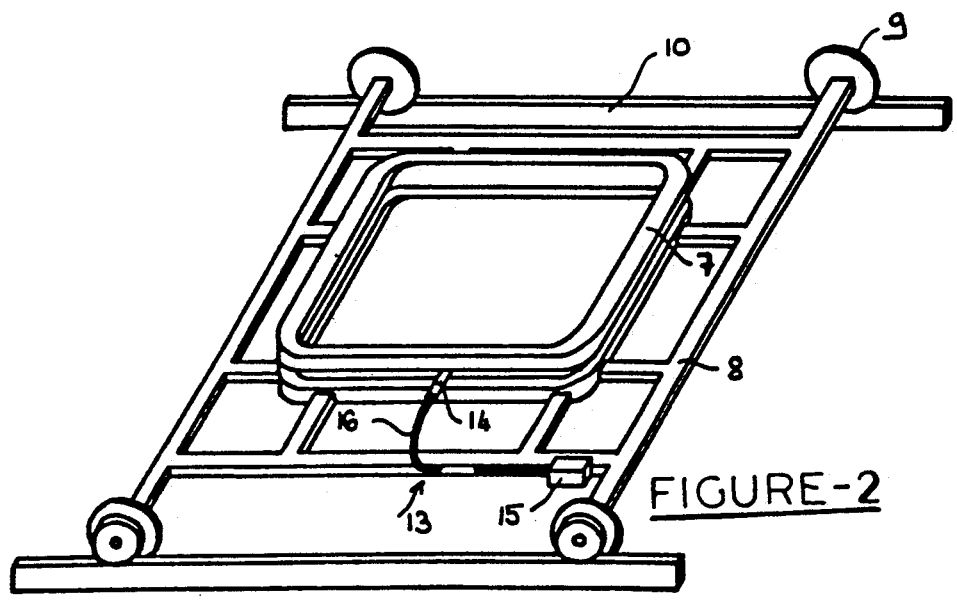
FIG. 2 shows a support frame according to the invention.

The above-mentioned problems are solved if, according to the invention and as shown in FIG. 2, the support frame 7 is equipped with a glass presence detection device 13. The support frame movement controls are then directly initialized by the real contact of the glass sheet and the tempering frame, which makes it possible to define a perfectly constant transfer time and therefore improves the reproducibility of the molding or shaping. It is even possible to slightly anticipate or advance detection, i.e., the glass sheet is reference marked during its fall.

The detection device is fixed to the trolley 8, the detection head 14 emerging at a limited distance from the glass sheet. Preferably, all the equipment 15 necessary for transforming the detected signal into electrical pulses is carried by the trolley and connected by an appropriate cable 16 to the detection head. An electric cable (not shown) having a sufficient swing to be able to tolerate all the movements of the carriage 8, connects the latter to an electric signal processing means located outside the glass heat treatment unit.

Figure 3:
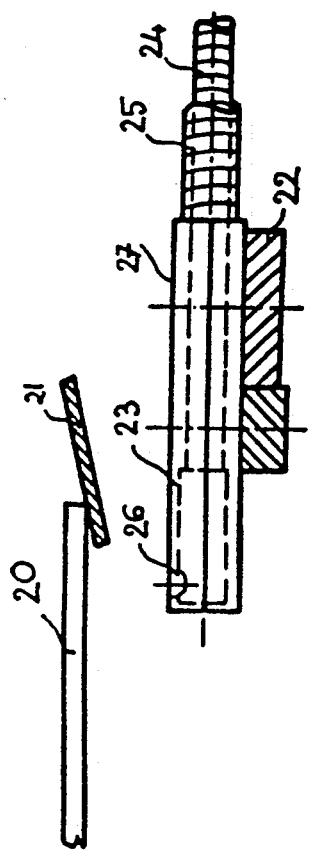
FIG. 3 shows the frame of FIG. 2 with an optical fiber detection device.

According to a first embodiment of the invention shown in FIG. 3, detection is obtained by optical means. In this sectional view it is possible to see the glass sheet 20 located on the support and tempering frame 21, preferably covered with a wide mesh, metal wire fabric in order to assist the evacuation of the air during tempering. Frame 21 is fixed by means not shown to trolley 22.

Trolley 22 has a recess 23, in which is fitted an optoelectronic detector of the optical fiber type 24 surrounded by a sheet 25, in which circulates a cooling fluid, such as compressed air. The assembly is accurately positioned by a mechanical fixing device.

The optical fiber has a radial outlet head 26 surrounded by a protection and fixing envelope 27 and its positioning is such that the light beam emerges perpendicular to the glass sheet. The distance between the outlet head 26 and the glass sheet 20, when the latter is detected, i.e., when it is placed on the frame or slightly prior to its placing thereon, is preferably less than 30 mm, so that the free outward and return path of the light beam has a length preferably less than 60 mm.

As a function of the sensitivity of the fiber chosen, i.e., in particular as a function of the number of fibers forming the light beam and its convergence, it is possible to vary the distance at which the glass is detected. It can in fact be advantageous to detect the glass sheet before it is even received by frame 21. However, this must obviously take place after it has left the upper cambering mold, so as to anticipate certain movements.

The cell for transforming the light beam into electrical pulses is fixed to the trolley 22 and the latter is transmitted by a flexible electric cable to a voltmeter connected to a programmable automatic means located outside the hot cambering-tempering enclosure.

Figure 4:
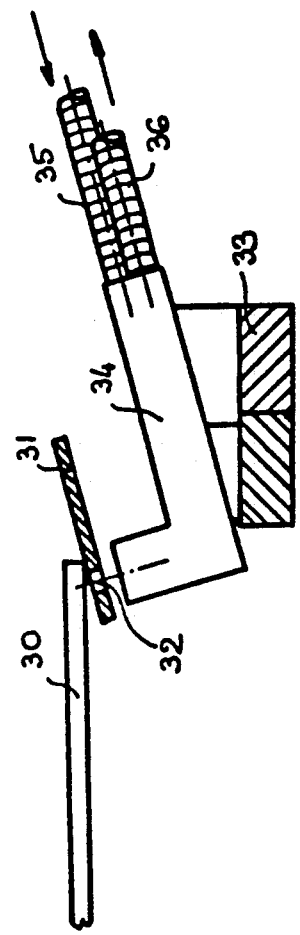
FIG. 4 shows the frame of FIG. 2 with a pneumatic detection device.

In a second embodiment of the invention diagrammatically shown in FIG. 4, detection is obtained by a pneumatic detector. For this purpose, the support frame 31 of the glass sheet 30 is perforated by an orifice 32 for the passage of compressed air or any other detecting fluid. The detecting nozzle 34 is fixed to the trolley 33 and is connected by cables 35 and 36 respectively to an emitting source and to a compressed air sensor.

The compressed air supply regulation takes place, for example, by means of a pressure relief valve, a high precision regulator and a digital display-equipped micromanometer. The air is purified by passing through a prefilter and then an oil-removal filter. Preferably, the supply means also has an air heating unit.

The nozzle is also connected to a sensor fixed to the trolley and having a return pipe and a transmitter. When a glass sheet 30 is received by the support frame 31, its presence induces a counterpressure transformed by the transmitter into an electrical pulse. The latter is then transmitted by the electric cable to a precision voltmeter and the measured recorded signal is transmitted to a programmable automatic means.

In more detailed manner and as described in French Patent Application 88 08136 filed on June 17, 1988, the nozzle has a base to which is screwed a body provided with a screw thread for fixing the nozzle to the tempering frame. The base is provided with level bores with which are welded the ends of the compressed air supply and return pipes, while providing expansion members.

The base is centrally recessed in order to form a channel and the opening is bent in order to issue towards the latter. The nozzle also has a duct fixed at one of its ends to a cap. The walls of this duct and the body form the ring-shaped emission nozzle. Thus, the compressed air jet is blown through an annular ring, which limits its impact on the glass. The return pipe receives by the duct, the channel and the bend, the counterpressure induced by placing a glass sheet on the tempering frame.

Advantageously, the compressed air is emitted with a pressure of approximately 4 kilopascals, so that for a nozzle-glass distance of approximately 2 mm, the pressure difference induced by the passage of the glass plate is approximately 10 to 200 Pascals. As the air is hot and its impact on the glass is reduced by the annular shape of the nozzle, there is no marking of the glass sheet.

The time that the trolley is present in the hot cambering enclosure is low, and between two glass plates, the trolley and the tempering frame are intensely cooled by blowing, so that the transmitter is never heated to beyond a critical temperature for the operation thereof.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Support frame for a glass sheet that is heated to a temperature beyond its deformation temperature, comprising:

a moving trolley, said support frame being mounted on said moving trolley and having a shape adapted to the contour of the glass sheet, said moving trolley being movable into and out of a shaping station and to a position below an upper mold located within said shaping station, said shaping station comprising means for raising said heated glass sheet against said upper mold, wherein said moving trolley and said support frame are positioned below said upper mold when said heated glass sheet is raised against said upper mold;

a contactless detection device operatively connected to said support frame for selectively detecting the presence of said glass sheet within an area defined by a region adjacent to said upper mold and a region adjacent to said support frame including said support frame after said glass sheet has been released from said upper mold and generating a signal indicative thereof; and means for converting said signal received from said detection device into electrical pulses for controlling the movement of said support frame into and out of said shaping station in response to said detected signal.

2. Support frame according to claim 1, wherein said means for converting said signal into electrical pulses is connected to the moving trolley and to a precision voltmeter located outside the glass treatment enclosure.

3. Support frame according to claim 1 or 2, wherein said signal is a counterpressure induced by the reflection on the surface of the glass sheet of a pressurized gas jet.

4. Support frame according to claim 1 or 2, wherein said signal is a light beam reflected by the glass surface.

5. Support frame according to claim 4, wherein said light beam is carried by an optical fiber-type waveguide.

6. Support frame according to claim 4, wherein said light beam is carried by an optical fiber-type waveguide with a radial outlet.

7. Support frame according to claim 5, wherein the free path of the light beam is 60 mm or less.

8. Support frame according to claim 6, wherein said light beam is emitted perpendicular to the glass sheet.

* * * * *